Figure 1:
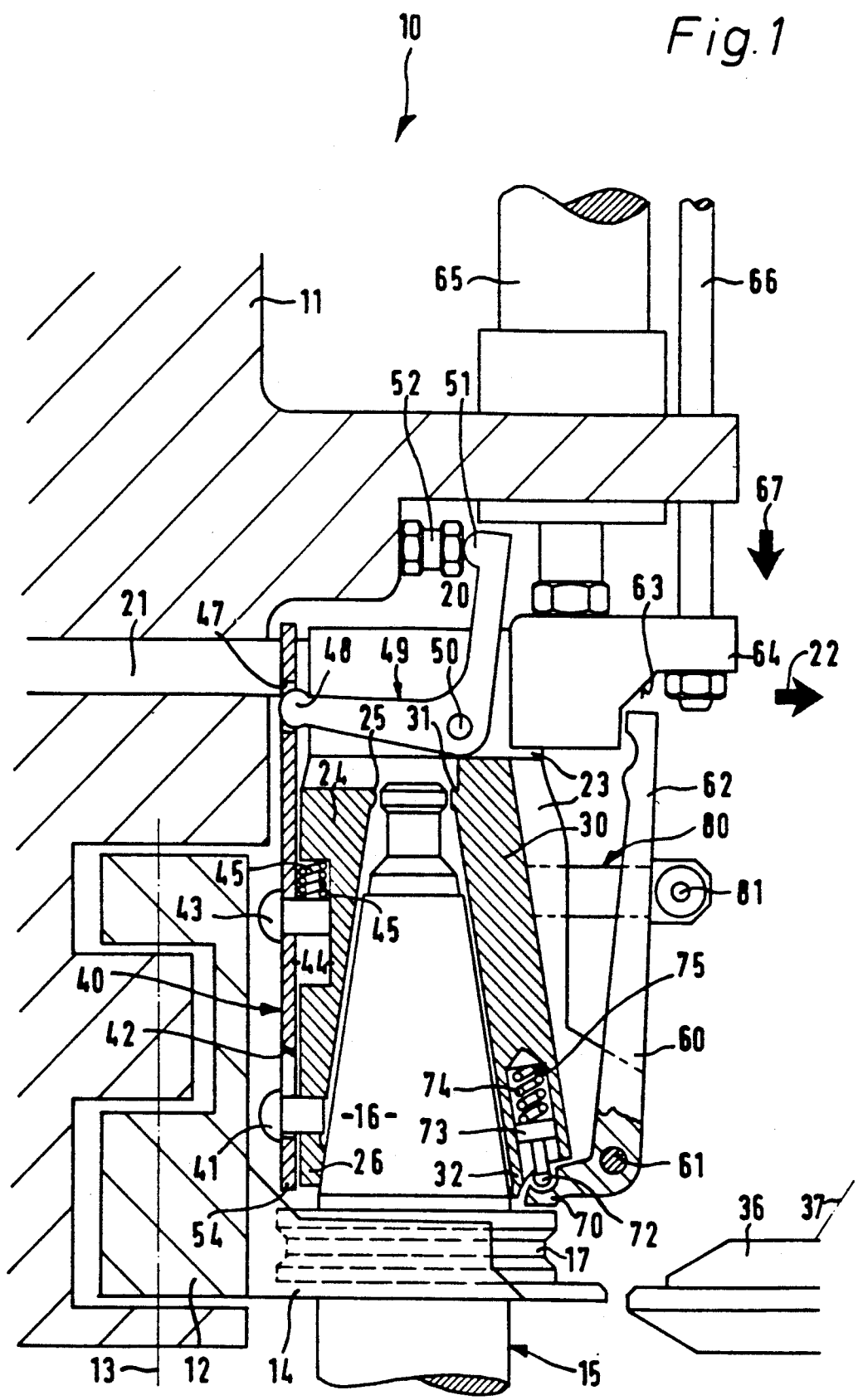

United States Patent [19]

Winkler et al.

[11] Patent Number: 5,018,265

[45] Date of Patent: May 28, 1991

[54] MACHINE TOOL

[75] Inventors: Hans-Henning Winkler, Tuttlingen; Eugen Rütschle, Mühlheim, both of Fed. Rep. of Germany

[73] Assignee: Chiron-Werke GmbH & Co. KG, Tuttlingen, Fed. Rep. of Germany

[21] Appl. No.: 584,450

[22] Filed: Sep. 14, 1990

Related U.S. Application Data

[63] Continuation of Ser. No. 247,252, Sep. 21, 1988, abandoned.

[30] Foreign Application Priority Data

Sep. 23, 1987 [DE] Fed. Rep. of Germany ....... 3732055

[51] Int. Cl.⁵ .............................................. B23Q 3/157
[52] U.S. Cl. ................................................... 29/568
[58] Field of Search .................................. 29/264, 568

[56] References Cited

U.S. PATENT DOCUMENTS

| | | | |
|---|---|---|---|
| 3,161,951 | 12/1964 | Anthony | 29/568 |
| 3,344,511 | 10/1967 | Hosea | 29/568 |
| 3,530,570 | 9/1970 | Shotter | 29/568 |
| 3,775,837 | 12/1973 | Tomita, et al. | 29/568 |
| 3,837,070 | 9/1974 | Ochiai et al. | 29/568 |
| 3,893,227 | 7/1975 | Suzuki et al. | 29/568 |
| 4,087,901 | 5/1978 | Lohneis et al. | 29/568 |
| 4,399,603 | 8/1983 | Reed | 29/568 |
| 4,683,638 | 8/1987 | Winkler et al. | 29/568 |
| 4,722,133 | 2/1988 | Nomura et al. | 29/568 |

FOREIGN PATENT DOCUMENTS

| | | |
|---|---|---|
| 2525212 | 6/1975 | Fed. Rep. of Germany . |
| 3531160 | 8/1985 | Fed. Rep. of Germany . |
| 58-171236 | 2/1983 | Japan . |
| 1547469 | 7/1977 | United Kingdom . |
| 2025805 | 5/1979 | United Kingdom . |

Primary Examiner—Z. R. Bilinsky
Attorney, Agent, or Firm—Pretty, Schroeder, Brueggemann & Clark

[57] ABSTRACT

A machine tool comprises a magazine for toolholders which can be transferred, by means of a transfer system, from a fixture arranged for being displaced in the magazine into a hand of a gripper arm.

In order to guarantee that the tool holders are transferred from the magazine into the hand of the gripper in an exactly defined position, the transfer means comprises means for fixing the said toolholders against rotation.

6 Claims, 2 Drawing Sheets

MACHINE TOOL

This application is a continuation of application Ser. No. 247,252, filed Sept. 21, 1988 abandoned.

The present invention relates to a machine tool comprising a magazine for toolholders which can be transferred, by means of a transfer system, from a fixture arranged for being displaced in the magazine into a hand of a gripper arm.

A machine tool of this kind has been known before from U.S. Pat. No. 4,683,638.

In the case of the known machine tool, a spindle stock can be displaced in a direction vertical to a work table. A tool magazine of horseshoe shape—when viewed from above—is arranged at the top of the spindle stock, in its rearward area. The two forward ends of the horseshoe are adapted to enable toolholders to be removed from or inserted into a transfer position, by means of gripper arms, for the purpose of exchanging toolholders between the positions of the tool magazine and a spindle position in the fixture of the spindle stock.

The fixtures of the tool magazine in the area of the beforementioned positions are designed in the form of U-shaped hands which are open on the side facing the transfer position. During the transfer process, a hand of complementary shape provided on the gripper arm is positioned opposite the U-shaped hand of the tool magazine. Now, the toolholders can be transferred by corresponding transfer means from the hand of the tool magazine into the hand of the gripper arm, or vice versa. For this purpose, a bar is arranged above the horseshoe-shaped track for the hands of the machine tool, which bar extends in parallel to the legs of the horseshoe and is provided at its forward free ends with holding parts for the transport of the tools. Viewed in a direction perpendicular to the direction of withdrawal of the transfer means, the holding parts have a shape adapted to the outer contour of the toolholders, in particular to the conical shape of their upper tapered portions. In this manner, the toolholder is retained in form-locking engagement during withdrawal and insertion and prevented from tilting in forward or rearward direction.

The displaceable fixtures of the tool magazine of the known machine tool are designed in such a manner that a recess provided at the periphery of the toolholders comes into engagement with a matching projection provided on the fixture so that the toolholders are fixed against rotation in the fixtures and are safely prevented from leaving their relative rotary position, even at high travelling speeds, in particular in the curved portions of the horseshoe-shaped path. The same applies by analogy to the hands on the free ends of the gripper arms, which are likewise designed in such a manner that the toolholders are fixed therein against rotation.

It is ensured in this manner that the toolholders can be inserted into the fixture of the spindle stock in a defined rotary position so that the key provided in the fixture and intended for driving the tool can be brought into engagement with the matching groove in the toolholder without a search run so as to establish the form-locking connection between the rotary spindle and the tool required for driving the tool.

It has been found, however, that difficulties occur during the rapid transfer from the tool magazine into the hand of the gripper arm, and this in particular at high tool-changing speeds, because during the rapid transfer movement the tools may get displaced from their reference position and assume an undefined position.

Now, it is the object of the present invention to improve a machine tool of the before-described kind in such a manner that the toolholders can be safely transferred from the magazine into the hand of the gripper arm, without any errors regarding their position, and this even at high tool-changing speeds.

This object is achieved according to the invention by the fact that the transfer means comprises means for fixing the toolholders against rotation.

This solves the object underlying the present invention fully and completely because the toolholders cannot at any moment of the transfer process come off their defined rotary position. As long as the toolholders are still contained in the fixture of the machine tool, they are secured in their defined reference position by the means fixing them against rotation described before, and the same applies by analogy to the time the toolholders remain in the hand of the gripper arm. If, according to the invention, the transfer means are now also provided with means for fixing the toolholders against rotation, then this defined condition will be maintained throughout the whole time of the tool-changing process.

It is ensured in this manner that the advantages already achieved by the known machine tool can be maintained in spite of high tool-changing speeds, because the tools can be transferred from the defined position in the magazine into a similarly defined position in the fixture of the spindle.

According to a preferred embodiment of the invention, the means are provided with locking parts engaging recesses provided at one periphery of the toolholder.

This feature provides the advantage that the recesses, which are anyway provided at the periphery of the toolholder and which also serve for fixing the latter against rotation in the magazine and in the hand of the gripper arm, can be used and that no additional modifications of the usually standardized toolholders are required.

According to a preferred improvement of this variant, the locking parts engage the recesses in a direction substantially parallel to the longitudinal axis of the toolholder.

This feature provides the advantage that the toolholders are permanently fixed against rotation, really without any interruption. For, the fixture of the tool magazine, as well as the fixture of the hand of the gripper arms are usually provided with a key projecting laterally into a recess provided in the periphery of the toolholder. Now, when the toolholder is removed from either of these fixtures in a direction perpendicular to its longitudinal axis, the locking part may engage the same recess from above as the key of the fixture is withdrawn from the same recess, so as to ensure that the toolholder is fixed against rotation without any interruption.

According to a further preferred improvement of this embodiment of the invention, the locking parts can be moved into a locking position by the force of a spring.

This feature provides the advantage that during the transfer movement of the toolholders, the locking parts will lock the toolholders automatically in place, under the effect of the spring, without any additional external forces being required.

According to another preferred improvement of this variant, the locking parts are provided with a two-armed lever.

This feature provides the advantage that the locking parts can be withdrawn again from their locking position, for example by the before-mentioned force of the spring, by means of the two-armed lever, and that it is possible, by suitable selection of the length of the lever arms, to translate short actuation paths into long locking or releasing paths, or vice versa, depending on the particular requirements and based on the existing constructional conditions.

According to a preferred embodiment of the invention, first means can be automatically operated, when the transfer means are actuated, by means of stationary stops provided on the machine tool.

This feature provides the advantage that the locking means for the toolholders is actuated by the mere contact with the stationary stops so that defined releasing and/or tensioning of the locking means can be ensured exactly at the moment when the toolholder occupies a defined position relative to the machine tool. This is of particular importance because the toolholders in the magazine have to be picked up from a track along which they are moved by the rapidly travelling fixtures of the magazine. This means that during the search run of the magazine, a series of many toolholders is moved past the transfer means waiting on both sides of the tool-holder, ready for gripping a toolholder from the front and from the rear and for transferring it into the hand of the gripper arm waiting on the opposite side. Considering that the toolholders pass the contour left clear by the transfer means at very high speed, it must be ensured in any case that the locking means are also released in this position so as to prevent the passing toolholders, under all circumstances, from hitting against the locking means and being damaged, or even stopping the machine tool altogether. This can be ensured, however, when the locking means are released by their contact with the stationary stop because in this case it is only necessary to adjust the stationary stop in such a manner that the locking means will be in the released condition just when the transfer means occupies the beforedescribed position in which the toolholders are permitted to pass.

In a practical embodiment of this variant, a base part of the transfer means carries a two-armed lever arranged for pivoting about a horizontal axis, perpendicularly to the direction of removal, which lever, in the withdrawn condition of the transfer means, has one arm in contact with a stationary stop, while its second arm pulls a first locking part out of engagement with a recess provided at the periphery of the toolholder, against the force of a spring. The before-described features already achieve the combined advantages mentioned before.

According to a preferred variant of this embodiment, the spring is arranged in a first holding part which holds the toolholder in form-locking engagement in the direction of withdrawal.

This feature provides the advantage that all means for tensioning and/or releasing the locking means are arranged on the retracted components of the transfer means so that no power has to be supplied from the machine tool itself.

Another group of embodiments provides that second means can be actuated by external force.

This feature provides the advantage that locking means can be operated also on those points of the transfer means which do no get into direct contact with the housing of the magazine.

In a practical embodiment of this variant, the transfer means can be retracted in the horizontal direction, a piston-and-cylinder unit with a stop element can be displaced in a vertical direction and, when entering the transfer means, can be moved into such a vertical position that a two-armed lever arranged for being pivoted about a horizontal axis has one arm in contact with the stop element and pulls a second locking element out of engagement with a recess provided at the periphery of the toolholder, against the action of a spring.

This feature provides the advantage that when retracting the transfer means a quasi-stationary stop is formed by the extended stop element of the piston-and-cylinder unit so that in this case, too, precise releasing of the locking means is ensured in the same manner as has been described above.

In addition, the vertically displaceable stop element provides the advantage that when the transfer means is in the retracted position, the passing toolholders are still guided in the fixtures of the magazine when the stop element is moved, for example, into a vertical position in which the annular flanges of the toolholders are arranged; the toolholders then move along the rear face of the stop element so that they are prevented from coming off the fixture in the transfer position, as a result of the centrifugal forces encountered, when the transfer means is in the retracted position, and this even when the toolholders are travelling at high speed.

One variant of this embodiment distinguishes itself also by the fact that the spring is arranged in a second holding part by which the toolholder is held in form-locking engagement in the direction of withdrawal.

The advantages that can be achieved with the aid of this feature have been described already above.

A particularly preferred arrangement is achieved when the before-described embodiments are combined in such a manner that the first locking part is arranged on the side of the toolholder facing the fixture, while the second locking part is arranged on the side of the toolholder facing the gripper arm.

This feature does not only provide the advantage that the toolholder can be held from both sides, but ensures in addition in an advantageous manner that the toolholder is fixed in one rotary position without any interruption, both during the withdrawal of a toolholder from the magazine and during insertion into the magazine, because the locking means arranged on both sides of the toolholders can take over the function of the locking means of the fixture and/or the hand of the gripper arm without any interruption, as previously described.

According to another preferred group of embodiments of the invention a third locking part is provided for preventing any tilting movement in a sense vertical to the direction of withdrawal of the transfer means.

This feature ensures in an advantageous manner that not only any unwanted rotation, but also any unwanted tilting of the toolholder is prevented, which may occur in particular during rapid transfer motions because the centrifugal forces encountered when the toolholders are moved at high speed may cause the toolholders to tilt, the center of gravity of the toolholder being very rarely located exactly in the holding plane of the fixture, the transfer means and the hand of the gripper arm.

In a preferred practical example of this embodiment of the invention, the third locking part is provided with two bolts which are arranged laterally of the toolholder and can be displaced in a sense perpendicular to the latter's axis and which, in the non-engaged position of the transfer means overlap the contour of the toolholders at least partly in a direction vertically to the direction of withdrawal.

This feature provides the advantage that any tilting is safely prevented with simple means, because the two lateral bolts can be moved close to the standardized taper, irrespective of the type of tool present in the toolholder, so that no notable tilting movement can occur.

According to a preferred embodiment of this variant, the bolts can be displaced by means of the lever.

This feature provides the advantage that the lever which is anyway provided for actuating the locking parts can be used simultaneously for displacing the bolts so that the considerations described above with respect to the synchronization of the different locking parts in the engaged and retracted condition of the transfer means apply by analogy.

According to another preferred variant of this embodiment of the invention, the bolts are pivoted on the lever about a horizontal axis and guided horizontally in the second holding part.

This feature provides the advantage that the necessary locking effect can be achieved by simple kinematics.

Other advantages of the invention will appear from the following description and the attached drawing.

It is understood that the features that have been described before and will explained hereafter may be used not only in the described combinations, but also individually or in any other desired combination without leaving the scope of the present invention.

Figure 2:
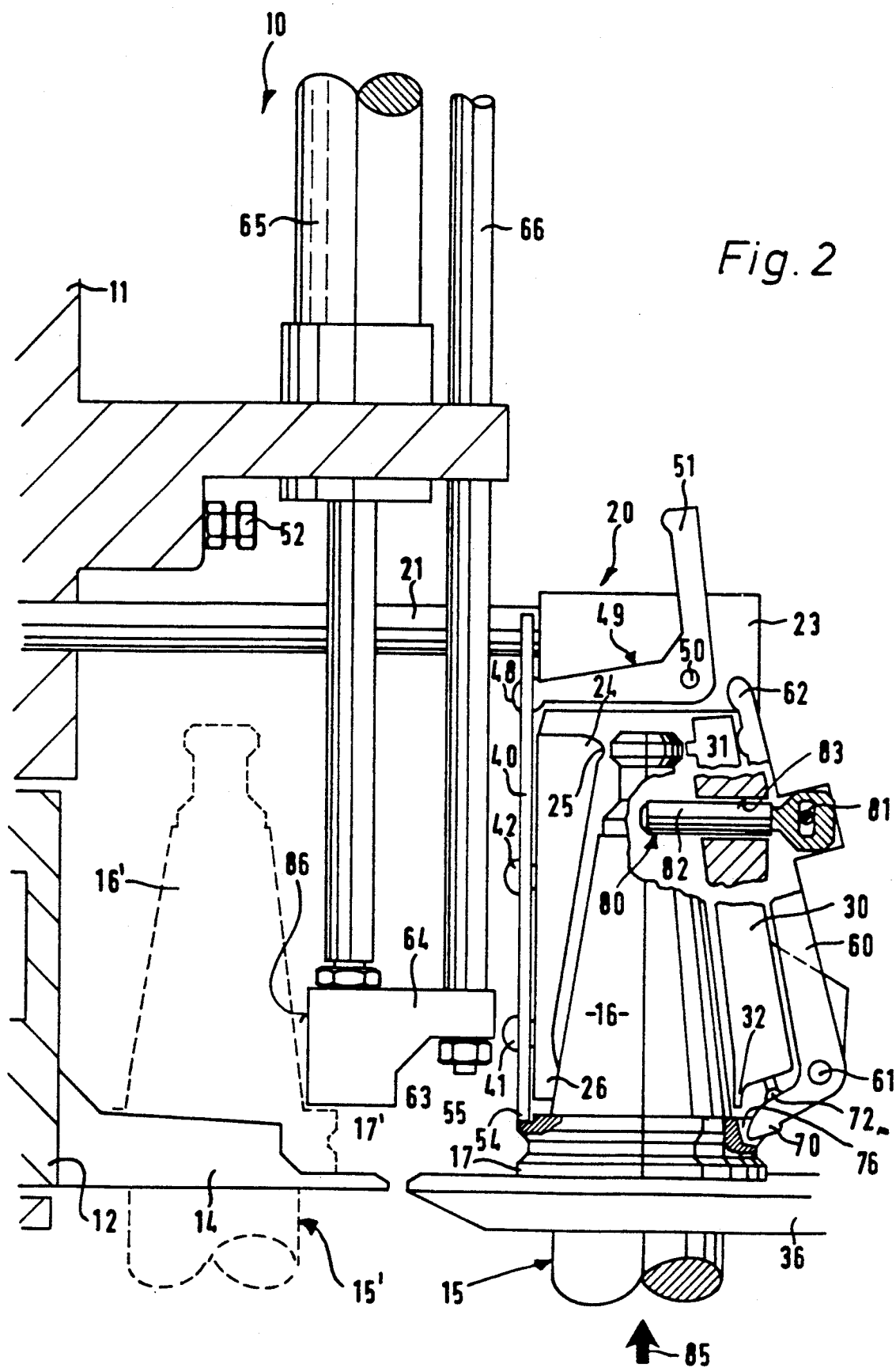

Certain embodiments of the invention are illustrated in the drawing and will be described hereafter in more detail with reference to the drawing in which FIG. 1 shows a side view, and partially a cross-sectional representation, of one embodiment of a machine tool according to the invention, with the transfer means in the engaged position; and FIG. 2 shows a representation similar to that of FIG. 1, but with the transfer means in the retracted condition.

In FIGS. 1 and 2, a magazine of a machine tool comprising a stationary housing 11 is generally designated by reference numeral 10. Reference numeral 12 indicates a fixture of the tool magazine which, just as a plurality of other fixtures, can be displaced along a predetermined path in the magazine 10, for moving selective toolholders into transfer positions of the magazine 10.

The details of such a machine tool have been described by U.S. Pat. No. 4,683,638 the disclosure of which is herewith incorporated into the present application by reference.

The fixtures 12 can be rotated about axes 13 and pivoted in a direction perpendicular to the drawing plane of FIGS. 1 and 2. The fixtures 12 are provided with a hand 14 of U-shaped configuration, viewed in a direction perpendicular to the drawing plane of FIGS. 1 and 2.

The receiving means 14 holds a toolholder 15 of standardized design comprising an upper taper 16 followed at its lower end by an annular flange 17. As a result of the U-shaped design of the receiving means 14, the toolholders 15 can be withdrawn from the fixture to the right, as viewed in FIGS. 1 and 2.

Transfer means designated generally by reference numeral 20 comprise an actuating bar 21 which can be moved in a direction of withdrawal indicated by 22 and in the opposite direction of engagement by, means of actuating means not shown in detail in FIGS. 1 and 2.

The forward free end of the bar 21 carries a base part 23 whose lower portion exhibits a fork-shaped design. The base part 23 is followed at its bottom, on the side of the housing 11, by a first holding part 24 whose upper end 25 and lower end 26 bear against the upper and lower ends, respectively, of the taper 16 when the transfer mean 20 is actuated to move in the direction of withdrawal 22.

A second holding part 30 is provided at the forward lower end of the base part 23, in substantially symmetrical arrangement to the first holding part 24. The upper end 31 and the lower end 32 of the said holding part 22 is in contact with corresponding upper and lower ends of the taper 16 when a tool holder 15 is to be moved into the fixture 12, in a direction opposite to the direction of withdrawal 22.

As can be seen best in FIG. 1, the holding parts 24, 30 are sized in such a manner that a free passage is provided for the toolholders 15, the ends 25, 26, 31, 32 being arranged at a certain play relative to the taper 16. It is, therefore, possible to displace the fixtures 12 in the magazine 10 until the desired toolholder 15 is in alignment with the transfer means 20 and can be withdrawn by actuating the bar 21.

When a tool change is to be effected, the opening of the hand 36 of the gripper arm 37 of the machine tool—which is indicated only diagrammatically in the drawing—is positioned symmetrically opposite the opening of the receiving means 14 of the fixture 12. When comparing FIGS. 1 and 2, it will be easily seen that a toolholder 15 can be transferred from the receiving means 14 into the hand 36 by lateral displacement of the transfer means 20.

In order to prevent the toolholder 15 from rotating or tilting during the transfer movement, whether the toolholder 15 is to be transferred from the receiving means 14 into the hand 36, or vice versa, the following measures have been provided:

A first locking part 40 of plate-shaped design is mounted to slide in the vertical direction on the rear side of the first mounting part 24. This is effected by a first bolt 41 fixed to the first holding part 24. The first bolt 41 is guided in a vertically extending oblong hole 42 in the first locking part 40. A second bolt 43 is fixed to the first locking part 40. The free end of the second bolt 43 is guided in an oblong recess 44 which likewise extends in the vertical direction. The oblong recess 44 accommodates the spring 45 which is in the compressed condition when the first locking part 40 occupies its upper end position illustrated in FIG. 1.

Above the second bolt 43, one can see another recess 47 in the first locking part 40. This other recess 47 is engaged by a first ball end 48 provided on the free end of one arm of a two-armed lever 49 which is mounted to rotate about a horizontal axis 50. In the engaged end position of the transfer means 20 illustrated in FIG. 1, a second ball end 51 provided on the free end of the other arm of the lever 49 rests against an adjustable stop 52 of the magazine 10 which is fixed to the housing.

A second locking part 60 is arranged on the side of the toolholder 12 opposite the first locking part 40. The second locking part 60 is mounted to rotate about a horizontal axis 61. An upper end 62 of the second locking part 60 rests against a face 63 of a stop element 64 which can be displaced in the direction indicated by arrow 67, by means of a piston-and-cylinder unit 65, and guided by a guide rod 66.

A lower end 70 of the second locking part 60 is provided with a cup which is engaged by a third ball end 72. The third ball end 72 forms the free end of a rod of a piston 73 running in a blind bore 75 of the second holding part 30, against the force of a spring 74. In the engaged end position of the transfer means 20 illustrated in FIG. 1, the spring 74 is in the compressed condition.

A third locking part 80 also exhibits a fork-like shape, viewed in a sense perpendicular to the plane of FIGS. 1 and 2. The third locking part 80 is mounted to pivot about a horizontal axis 81 on the rear side of the second locking part 60. The third locking part 80 is provided with two bolts 82 which are guided horizontally in corresponding bores 83 in the second holding part 30.

The transfer means 20 operates as follows:

In the engaged end position of the transfer means 20 illustrated in FIG. 1, the second ball end 51 of the lever 49 rests against the stationary stop 52 and occupies its right-hand end position. Consequently, the first ball end 48 of the two-armed lever 49, which forms a substantially right angle, occupies its upper end position and pulls the first locking part 40 into its upper end position, being in engagement with the recess 47. In this position, in which the spring 45 is completely compressed by the free end of the bolt 43, a lower tongue-shaped end 54 of the first locking part 40 is lifted off the annular flange 17 of the toolholder 15 in vertical direction.

The upper end 62 of the second locking part 60 rests against the face 63 of the stop element 64 at the front of the toolholder 15, thus occupying its right-hand end position. Due to the fact that the second locking part 60 also exhibits the shape of a two-armed lever, the lower end 70 of the locking part 60 occupies its upper end position, with its cup 71 urging the third ball end 72 and, consequently, the piston 73 against the spring 74, which is fully compressed in the blind bore 75.

Due to the fact that the second locking part 60 has been turned in clockwise direction about the horizontal axis 61 to its respective end position, the third locking part 80 has also been deflected to the right, as viewed in FIG. 1.

With the three locking parts 40, 60 and 80 in the described positions, the toolholder 15 is in no way retained in form-locking engagement as on the one hand the lower ends 54 and 70 of the locking parts 40 and 60 are lifted off the annular flange 17 and, on the other hand, the bolts 82 are located at the right side of the contour of the tool-holder 15—as viewed in FIGS. 1 and 2.

Now, when the transfer means 20 is displaced into the advanced position illustrated in FIG. 2, the first locking part 40 will move downwardly, under the action of the spring 45, the second ball end 51 being lifted off the stationary stop 52.

The same applies by analogy to the second locking part 60 whose upper end 62 has moved away from the face 63 of the stop element 64. The action of the spring 74 urges the third ball end 72 into the cup 71 at the lower end 70 of the second locking element 60, whereby the latter is urged into a recess 76 provided at the upper front of the annular flange 70.

As a result of the engagement between the lower ends 54 and 70 and the recesses 55 at the rear and 76 at the front of the angular flange 17, the toolholders 15 are fixed as regards their rotary position.

The rotation of the second locking part 60 about the horizontal axis 61, in counter-clockwise direction, also has the effect to displace the bolts 82 in the bores 83 to the left—as viewed in FIGS. 1 and 2—so that they project into the contour of the toolholder 15, as can be clearly seen in FIG. 2. This secures the toolholder 15 against tilting in a direction perpendicular to the drawing plane of FIG. 2.

The locking mechanisms described before are also active when the transfer means 20 has been advanced empty and a gripper arm 37 with a hand 36 and a toolholder 15 arranged therein is approached for the purpose of returning the toolholder 15, which has just been withdrawn from the spindle, into the magazine 10, using the transfer means 20. During this process, the toolholder 15 is approached to the transfer means 20 from below, as indicated by 85 in FIG. 2, and its taper is introduced from below into the active area of the locking parts 40, 60 and 80 and of the holding parts 24 and 30 so that the locking effect described above is automatically achieved.

It can be further seen in FIG. 2 that in the advanced position of the transfer means 20 the stop element 64 can be displaced downwardly until the rear side 86 of the stop element 64 serves as a guide for toolholders 15' moving past the stop element 64 at high speed in a direction perpendicular to the drawing plane of FIG. 2 for the purpose of bringing the empty fixture 12 into the proper position for inserting the toolholder 15 which in the view of FIG. 2 is still located in the area of the hand 36. Considering that, as has been explained above, the fixture 12 is positioned at the forward end of a circular path, considerable centrifugal forces acting towards the right in FIG. 2 are exerted upon the toolholders 15' as they pass the position shown in FIG. 2, so that the rear side 86 of the stop element 64 is capable of preventing the toolholders 15' from being dislodged, in the vertical position shown in FIG. 2.

When the transfer means for the magazine 10 is stopped, because the pre-selected fixture 12 has reached its receiving position, the piston-and-cylinder unit 65 is displaced upwardly into the position shown in FIG. 1. By retracting the transfer means 20 to the left, the upper end 62 of the second locking part 60 is now automatically moved into the position shown in FIG. 1, in contact with the face 63 which at this moment forms a stationary stop, similar to the really stationary adjusting screw 52, which is engaged by the second ball end 51 of the lever 49.

We claim:
1. A machine tool, comprising:
   (a) a plurality of toolholders, wherein each toolholder has an upper tapered section, a lower tool section and flange means therebetween, said flange means being provided with recesses;
   (b) a toolholder magazine having a plurality of receiving means for receiving said flange means, a predetermined one of said toolholders being received in an upright position within one of said receiving means located at a predetermined first transfer position within said toolholder magazine;
   (c) toolholder exchange means for exchanging toolholders between said toolholder magazine and a machine tool spindle, said toolholder exchange means having a pivotable arm carrying a hand, said hand being positioned at a second transfer position adjacent said first transfer position;

(d) transfer means connected to said toolholder magazine for transferring said predetermined one toolholder from said first transfer position to said second transfer position along a first horizontal axis, said transfer means having, a bar extending along said first horizontal axis above said toolholders and having a free end;

a base member connected to said free end;

a first and a second holding member extending from said base member in a downward direction, said holding members being spaced from each other along said first horizontal axis and defining between them a gap having a clearance that is wider than said upper tapered section of said toolholder to allow passage of said toolholders therethrough in a direction perpendicular to said first horizontal axis;

locking means having a first locking member connected to said first holding member and a second locking member connected to said second holding member, said first and second locking members each having a locking end mating with one of said recesses in said flange means of said toolholder; and actuating means for displacing said first and said second locking members to insert their respective locking ends into said recesses in a locking position when said predetermined one toolholder is transferred out of said first transfer position.

2. The machine tool of claim 1, wherein the locking ends of said first and said second locking members engage said recesses in a vertical direction.

3. The machine tool of claim 1, wherein said first and said second locking members are biased by springs for counteracting said actuating means.

4. The machine tool of claim 1, wherein said toolholder magazine has an adjustable stop means and a first lever pivotably mounted on said base member, said first lever having a first arm and a second arm, said first arm being adapted to engage said stop means and pivot said first lever when said transfer means is in a first operational position with said base member above said first transfer position, said second arm being adapted to engage said first locking member to pull its locking end out of a first one of said recesses when said first lever is pivoted.

5. The machine tool of claim 4, further comprising a piston-and-cylinder-unit having a stop element and being displaceable in a vertical direction, wherein said second locking member comprises a second lever adapted to be pivoted about a second horizontal axis, said second lever having an upper end and a lower end, said lower end including said locking end for engaging a second one of said recesses, said upper end being adapted to contact said stop element when said base member is above said first transfer position, said upper end being further adapted to pull the locking end of said lower end out of engagement with said second one of said recesses when said upper end is in contact with said stop element.

6. The machine tool of claim 5, further comprising a third locking member pivotably connected to the upper end of said second lever for displacement in a direction substantially parallel to said first horizontal axis, said third locking member having two spaced bolts adapted to receive a contoured portion of said toolholder when said base member is spaced from said first transfer position.

* * * * *